United States Patent [19]
Shelton

[11] Patent Number: 5,921,016
[45] Date of Patent: Jul. 13, 1999

[54] FISH HOOK REMOVER

[76] Inventor: Billy R. Shelton, 5279 Salisbury Dr., Newark, Calif. 94560

[21] Appl. No.: 08/795,277

[22] Filed: Feb. 5, 1997

Related U.S. Application Data

[60] Provisional application No. 60/011,218, Feb. 6, 1996.

[51] Int. Cl.$^6$ .................................................. A01K 97/18
[52] U.S. Cl. ........................................... 43/53.5; 294/19.1
[58] Field of Search ..................... 43/4, 53.5; 294/19.1

[56] References Cited

U.S. PATENT DOCUMENTS

| | | | |
|---|---|---|---|
| 2,294,758 | 9/1942 | Manske | 43/53.5 |
| 2,619,859 | 12/1952 | Peronto | 43/53.5 |
| 2,669,055 | 2/1954 | Doerr | 43/53.5 |
| 2,736,126 | 2/1956 | Mathews | 43/53.5 |
| 2,770,483 | 11/1956 | Patnaude | 294/19.1 |
| 2,861,384 | 11/1958 | Kubin | 43/53.5 |
| 3,514,145 | 5/1970 | Elgin et al. | 294/19.1 |
| 3,869,822 | 3/1975 | Tieman | 43/53.5 |
| 4,833,817 | 5/1989 | Silverthorn | 43/53.5 |
| 4,882,871 | 11/1989 | Marina | 43/53.5 |
| 5,192,104 | 3/1993 | Lin | 294/19.1 |

FOREIGN PATENT DOCUMENTS

| | | | |
|---|---|---|---|
| 748609 | 12/1966 | Canada | 43/53.5 |
| 672422 | 12/1929 | France | 43/53.5 |
| 873063 | 7/1961 | United Kingdom | 43/53.5 |

*Primary Examiner*—Michael J. Carone
*Assistant Examiner*—Darren Ark
*Attorney, Agent, or Firm*—Carol D. Titus; James J. Leary

[57] ABSTRACT

A fish hook remover for humanely removing a hook from a fish is particularly useful for catch-and-release fishing. The fish hook remover has a handle for a user to manipulate, a hook engagement member, and two rods which connect the handle and the hook engagement member. These connections are located such that the hook remover acts similar to a four-bar linkage. When the handle, forming one side of the four-bar linkage, is rotated one direction, the hook engagement member, forming the opposing side of the four-bar linkage, is rotated the same direction, thereby allowing the user to remotely control the motion of the hook engagement member. The hook engagement member has a channel running through it. An opening in the hook engagement member allows the user to insert the fishing line which is then used as a guide to properly place the fish hook remover. The hook engagement member is slid downward until the fish hook slides into a notch located in the bottom of the hook engagement member. At this point the fish hook is locked in place within the fish hook remover and the hook may be removed. There are several way to remove the hook, but the most basic is to twist the handle so that the hook engagement member rotates 180° which removes the fish hook by backing the hook out of the flesh of the fish in the direction it entered, thereby causing the minimum amount of trauma possible.

20 Claims, 12 Drawing Sheets

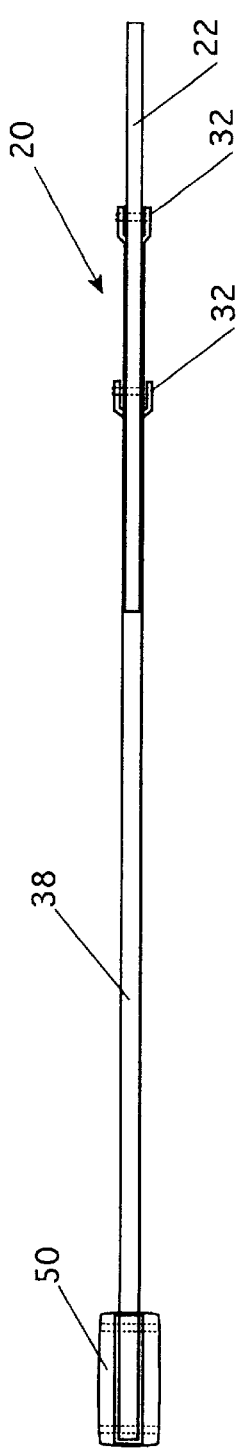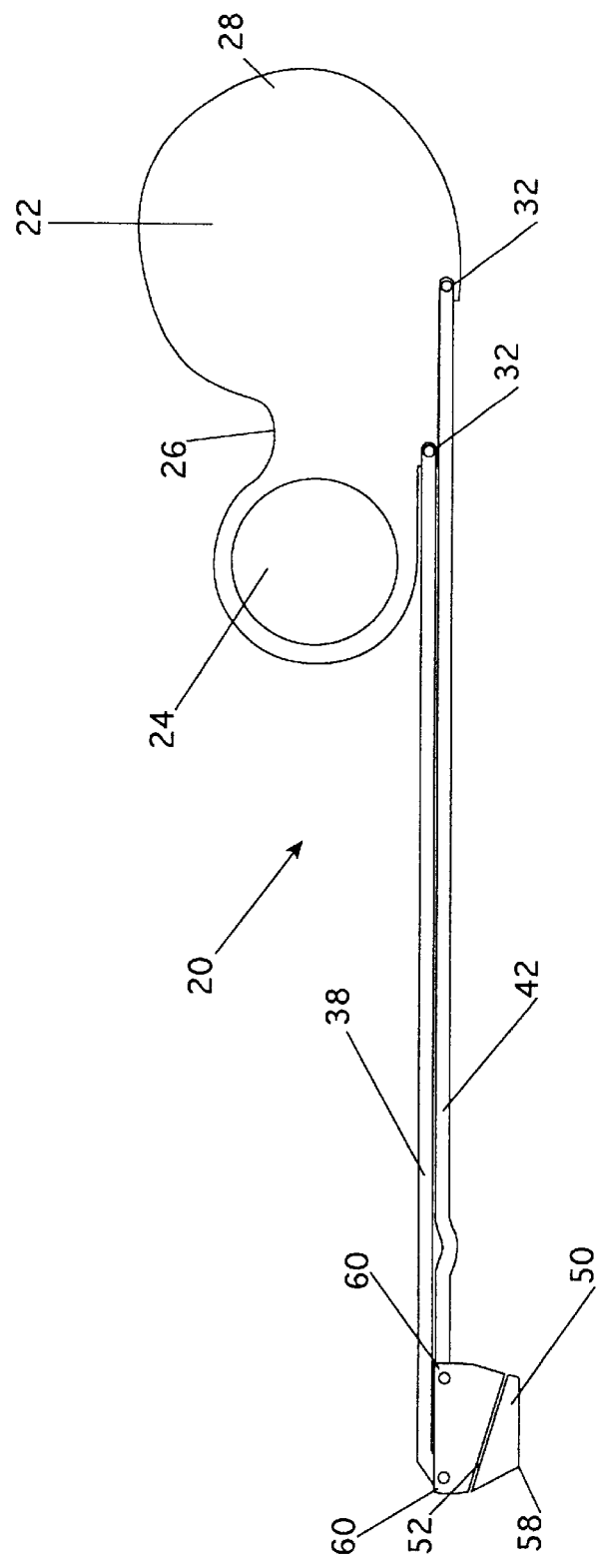
FIG 1B
FIG 1A

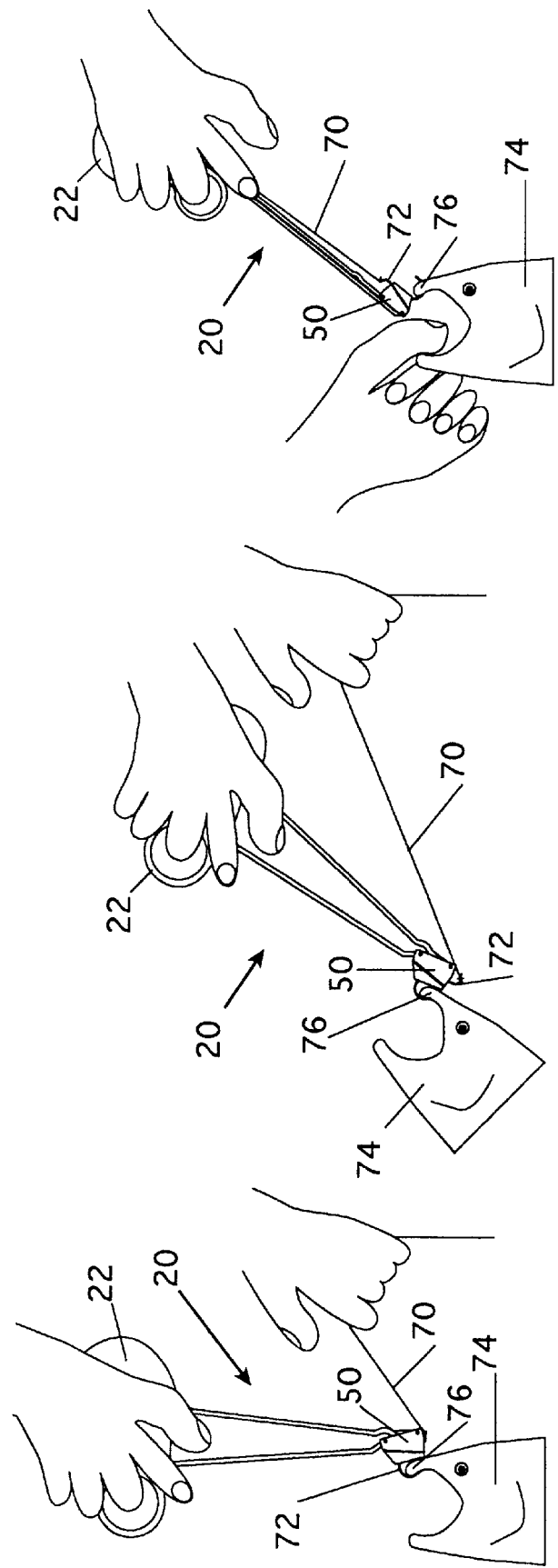

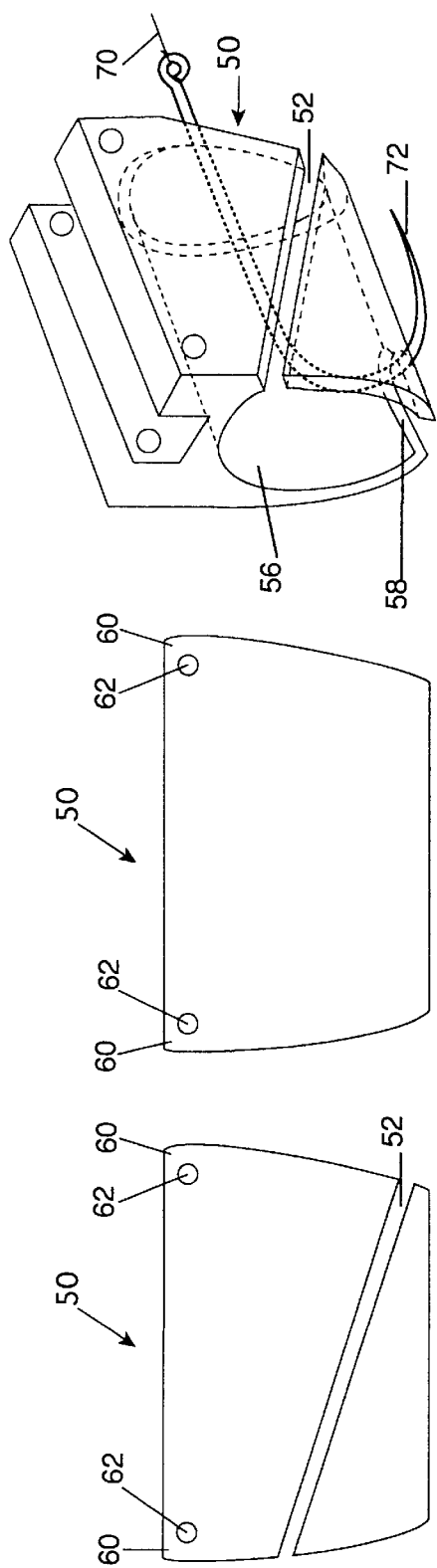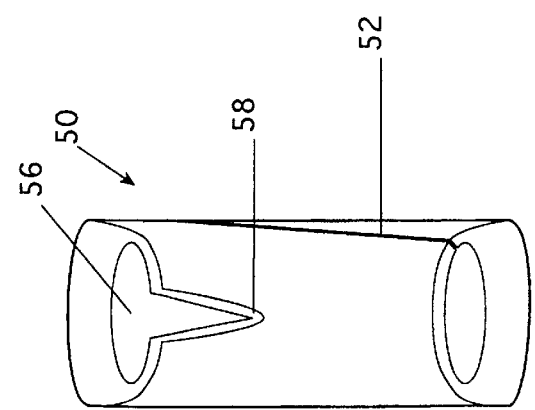

FISH HOOK REMOVER

RELATIONSHIP TO OTHER APPLICATIONS

This application claims the benefit of U.S. Provisional Application No. 60/011,218, filed Feb. 06, 1996.

FIELD OF INVENTION

The present invention relates generally to a device for removing hooks from fish. More particularly it relates to a fish hook removing device for causing a minimum of damage to a caught fish while removing a hook.

BACKGROUND OF THE INVENTION

The concept of fishing goes back before the beginning of recorded history, and man has continued to fish to provide food to eat and, today, as a recreational sport. As time has past, we have developed more and more refined fishing equipment and techniques to attract and catch fish. However, as more and more fisherman are drawn to the sport, we have begun to endanger some species of fish. In order to preserve endanger species and prevent other species from becoming endangered, limits have now been imposed fisherman as to size, type and quantity of fish they may keep. Catch and release fishing, where a fisherman releases fish, has become the single most important conservation tactic for the average fisherman.

However, the catch and release tactic may not actually save the fish which have been caught. A fish which has been hooked and released may very well be fatally injured. The hook removing process is particularly dangerous to the fish. During this time the fish is generally out of the water where they cannot breath; and, for a novice, the hook removing process may take long enough to endanger the life of the fish. Even more often, however, the process of removing the hook causes severe trauma to the area where the fish was hooked. Especially, if the hook was in the esophagus or close to vital organs, the wound and associated trauma may eventually kill the fish. An additional danger is created when the fisherman is removing the hook from the fish. The removal process frequently disturbs the mucus which protects the fish from germs. When this protective coating is disturbed or removed, the fish is more likely to sicken and die.

A further danger, in this case to the fisherman, is damage to the hand being used to release the hook. Some fish have characteristics which may injure the fisherman. These characteristics include such things as sharp teeth, aggressiveness, sharp gill plates, and dangerous thorns, spikes or fins. These characteristics increase the chances that a fish may wound a fisherman who is trying to release a hook from the fish's flesh.

Therefore, it is clear that there is need in the industry for a device which removes a hook from a fish while causing a minimum of damage and trauma to the fish and helps protects the fisherman from injury.

SUMMARY OF THE INVENTION

In keeping with the foregoing discussion, the objective of the present invention is to provide a hook removing device which quickly, effectively, and with minimal damage to the fish, removes a hook from a fish. Optimally, this should be done without requiring the fisherman to hold and/or manually manipulate the fish, thereby keeping the mucus of the fish generally intact and protecting the fisherman's hands from spikes, bites, etc.

It is a further object of the present invention to provide a device which can remove a hook from virtually any part of a fish, including the lips, mouth, throat, esophagus, tongue, and gill plate.

Yet another objective of the present invention is to provide a fish hook removing device which can remove a hook from many types of fish including those who have lockjaws, small mouths, large mouths, sharp teeth, aggressive natures, sharp gill plates, bony mouths, and dangerous thorns, spikes, and fins.

It is yet another objective of the present invention to remove both single and treble hooks from a fish no matter where the hook has been taken by the fish. The present invention may be used with both bait and fly fishing, including the use of flies, streamers, etc.

A further objective of the present invention is to allow a fisherman to remove a hook from a fish without lifting the fish out of water.

In keeping with these objectives, the present invention takes the form of a fish hook remover having a handle for a user to manipulate and a hook engagement member. Between the handle and hook engagement member are two rods. One side of the handle is attached to the first rod, at a spaced apart location the handle is also attached to the second rod. One side of the hook engagement member is attached to the first rod and the other side of the hook engagement member is attached to the second rod. These connections give the hook remover an action similar to a four-bar linkage. When the handle is rotated one direction, the hook engagement member is rotated the same direction, thereby allowing the user to remotely control the motion of the hook engagement member.

The hook engagement member has a slot through which the fishing line is placed. This allows the user to use the fishing line as a guide to properly place the fish hook remover. The hook engagement member is slid downward until the fish hook slides into a notch located in the bottom of the hook engagement member. At this point the fish hook is locked into the fish hook remover and the hook may be removed. There are several ways to remove the hook, but the most basic is to rotate the handle using your middle finger and the palm of your hand so that the hook engagement member rotates 170° which removes the fish hook by backing the hook out of the flesh of the fish in the direction it entered, thereby causing the minimum amount of trauma possible. Other objects and advantages of the invention will no doubt occur to those skilled in the art upon reading and understanding the following detailed description along with the accompanying drawings.

BRIEF DESCRIPTION OF THE DRAWINGS

FIG. 1A is a side view of the fish hook remover.

FIG. 1B is a top view of the fish hook remover.

FIG. 7 shows a gravity method of removing a hook from a lip-caught fish.

FIG. 8 shows a momentum method of removing a hook from a lip-caught fish.

FIG. 9 shows a manual fish contact method of removing a hook from a lip-caught fish.

FIGS. 11A–11G show enlarged detail views of the hook engagement member of the fish hook remover.

DETAILED DESCRIPTION OF THE INVENTION

Figure 2A:
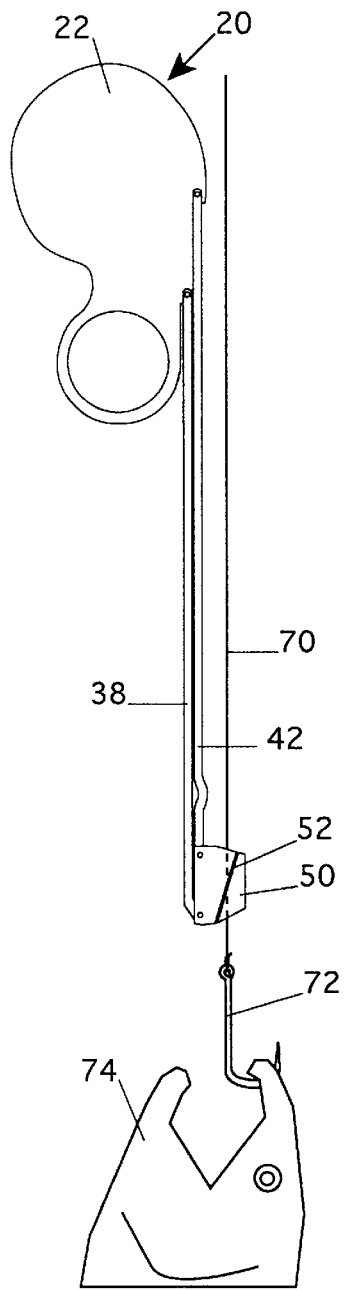
FIGS. 2A–2C show the steps involved in removing a hook from a lip-caught fish using the fish hook remover.

FIG. 1A is a side view and FIG. 1B is a top view of the fish hook remover 20. At one end of the fish hook remover 20 is a handle 22. Preferably, the handle 22 is made with an ergonomic shape. A user's finger may be placed within a hole 24 in the handle 22. This allows the user finer control over the movement of the fish hook remover 20 as well as assuring a firm grip so that the fish hook remover 20 will not be accidentally lost if a fish is struggling and fighting. Adjacent the hole 24 in the handle 22 is an indentation 26 in the perimeter of the handle 22. A second or other finger of the user may be rested within the indentation 26 which provides finer control over the fish hook remover 20.

Two rods 38, 42 are connected to the handle at spaced apart locations 32 along the perimeter of the handle 22. The opposite ends of these rods 38, 42 are connected to adjacent corners 60 of a hook engagement member 50. The hook engagement member 50 serves a number of purposes. A slot 52 on one side of the hook engagement member 50 allows a user to guide the fishing line into a channel 56 running through the center of the hook engagement member 50 (shown in FIGS. 11C–11F). The fishing line 70 then guides the fishing hook 72 into the channel 56. A slot or stripper notch 58 (shown in FIGS. 11C, 11D, and 11F) holds the hook 72 steady in relation to the hook engagement member 50 while the hook 72 is being removed from the fish 74.

Figure 2B:
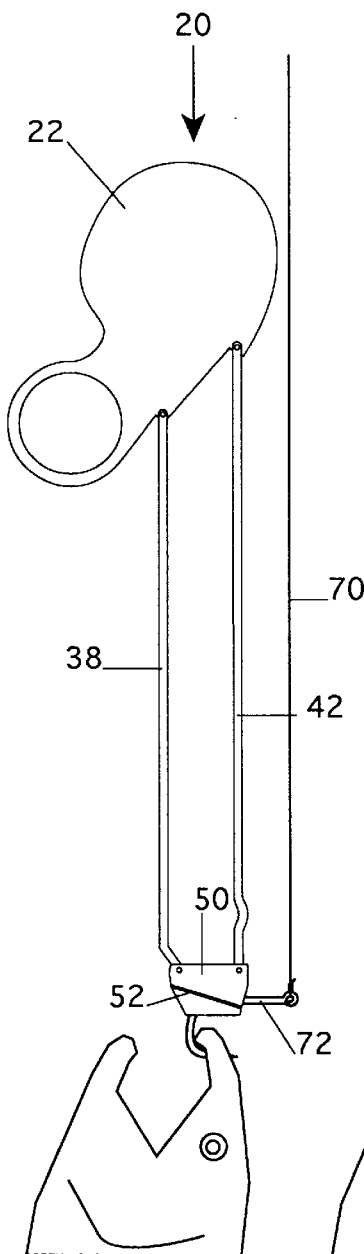
Figure 2C:
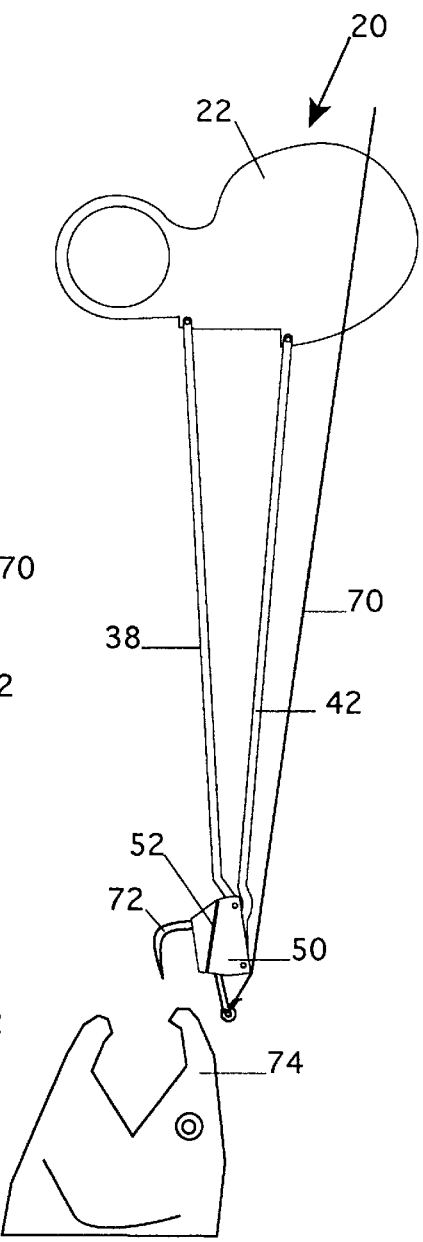
Figures 3A, 3B, 3C, 3D, 3E:
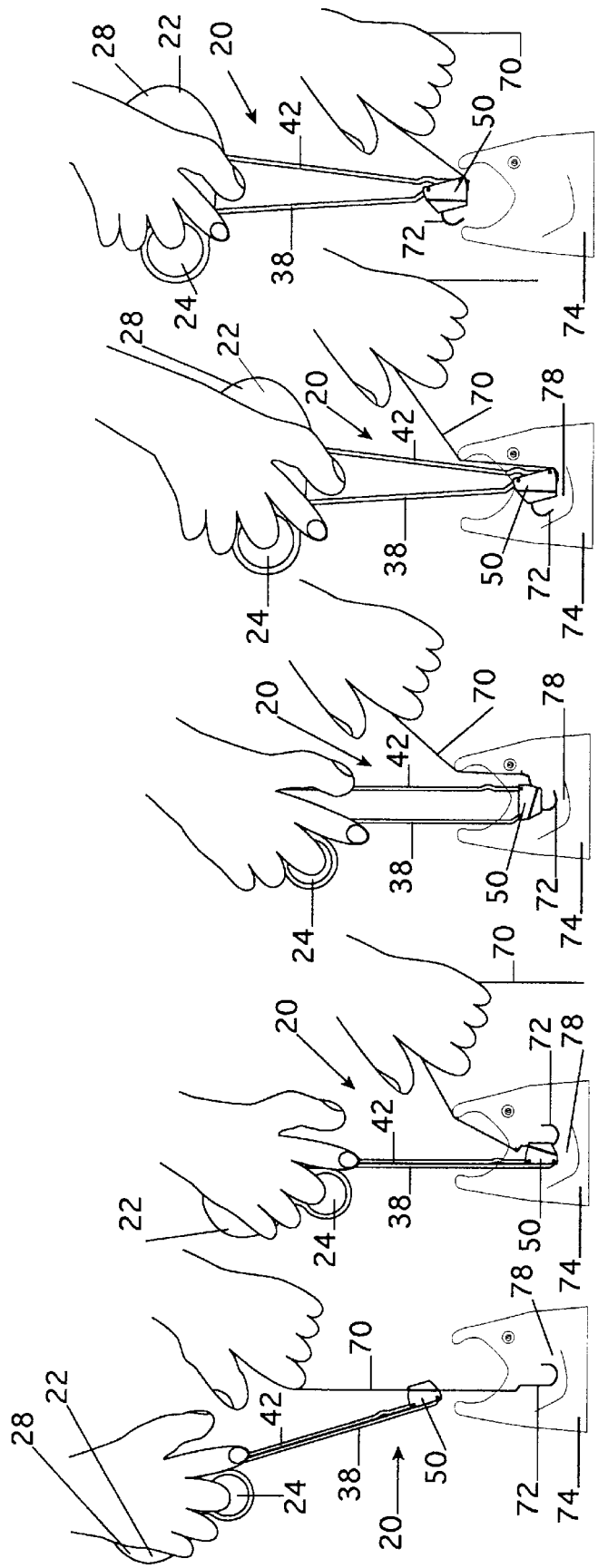
FIGS. 3A–3E show the steps involved in removing a hook from a throat-caught fish.

FIGS. 2A–2C show the steps involved in removing a hook 72 from a fish 74. To operate, a user places the fish hook remover rods 38, 42 across the fishing line 70 at an angle, for example tilted to the side about 30° and back about 15°, then slides fish hook remover 20 across line 70. When the line 70 contacts the slot 52 in the hook engagement member 50, it will pop through the slot 52 and into the channel 56. As shown in FIG. 2A, the fish hook remover 20 is then brought parallel to the line 70 and slid down to the hook 72. This motion is done while keeping the line 70 pressed to the sealed side (see FIG. 11B) of the hook engagement member 50 which keeps the line 70 from coming out of the slot 52 accidentally. When the fish hook remover 20 comes in contact with the hook 72, it is desired that the tip of the hook 72 be pointed in the direction of the stripper notch 58. This allows the hook 72 to drop into the stripper notch 58 to obtain a positive lock. The starting process for all of the following methods disclosed herein will start from this positive lock position.

After the hook 72 has been locked into place, the user rotates the handle 22 which rotates the hook engagement member 50 in the same direction. In FIG. 2B, the handle 22 has been rotated approximately 45°. The handle 22 has rotated the hook engagement member 50 approximately 90° which has turned the hook 72 most of the way out of the flesh of the fish 74. In FIG. 2C, a handle 22 rotation of approximately 90° has rotated the hook 72 almost 170° and the hook 72 has been fully removed from the fish 74, thereby allowing the fish 74 to swim away untouched by the fisherman's hands and with minimal damage from the hook 72. The difference in rotation between the handle 22 and the hook engagement member 50 is created because the distance between the rod attachments on handle 22 is significantly more than the distance between the rod attachments on the hook engagement member 50, in this case a ratio of about 1 to 1.5. The difference between these distances amplifies the rotation of the hook engagement member 50. If preferred, the distances between the attachments could be made equal so that the rotation would be one-to-one, or the difference could be reversed in cases where a full rotation of the hook is not required.

FIGS. 3A–3E show the steps involved in removing a hook 72 from a throat-caught 78 fish 74, as well as the standard positioning of a fisherman's hand on the fish hook remover 20. This method also applies to removing a hook 72 from any area of the fish 74 that is difficult to see or reach such as the throat 78, mouth, esophagus, tongue and gills. The body or widened section 28 of the handle 22 of the fish hook remover 20 is held in the palm of the hand. The middle finger is placed through the hole 24 in the handle 22 with the user's thumb pointing down approximately parallel to the rods 38, 42.

The first step in removing the hook 72 is to get the fish 74 under control so that no flopping occurs while the user is removing the hook 72. Then, after locking the hook 72 in place as previously described, firmly grasp the fishing line 70 and push down on the fish hook remover 20 as you rotate the handle 22. This starts the hook 72 backing out the same hole it went in. After the hook 72 is rotated and disengages from the fish 74, slowly remove the hook 72 from where it has penetrated fish 74. This process forces the hook 72 to go out the same hole that it went in thereby minimizing bleeding and harm to the fish 74. If the fish 74 is hooked deep in the esophagus, then, as the user slowly pulls the fishhook 72 from the fish's throat 78, he or she keeps fish hook remover 20 pushed forward against the side of throat 78. If there are difficulties getting the hook 72 to clear the tight area of the throat 78, then the handle 22 is gently rotated back and forth. This walks the fish hook remover 20 out of the throat 78 (note: once the hook 72 is flipped within the throat area, it stays flipped).

Figure 4:
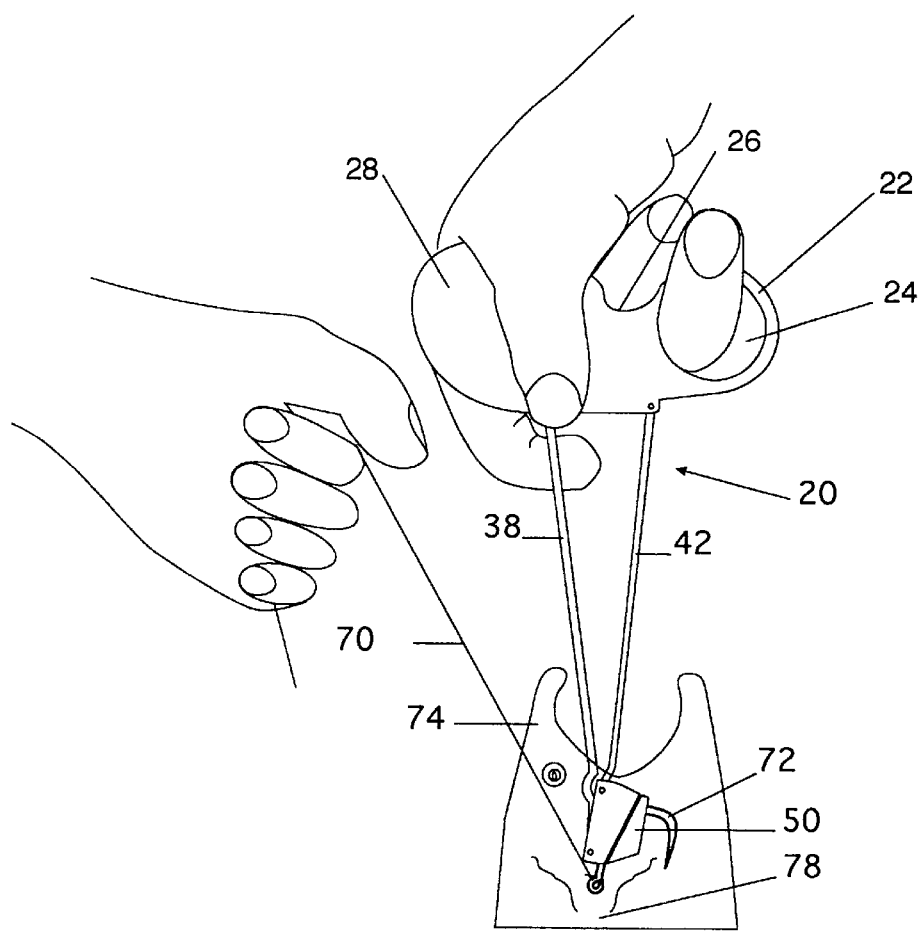
FIG. 4 shows a more controlled method for removing a hook from a throat-caught fish.

FIG. 4 shows a more controlled method for removing a hook 72 from a throat-caught 78 fish 74. The user places his or her middle finger in the hole 24 in the handle 22. The third finger is placed within the indentation 26 adjacent the hole 24, and the thumb and first finger grasp the wider, solid section 28 of the handle 22. This gives the user the finest control over minute movement of the handle 20 and the corresponding movement of the hook engagement member 50.

Figure 5:
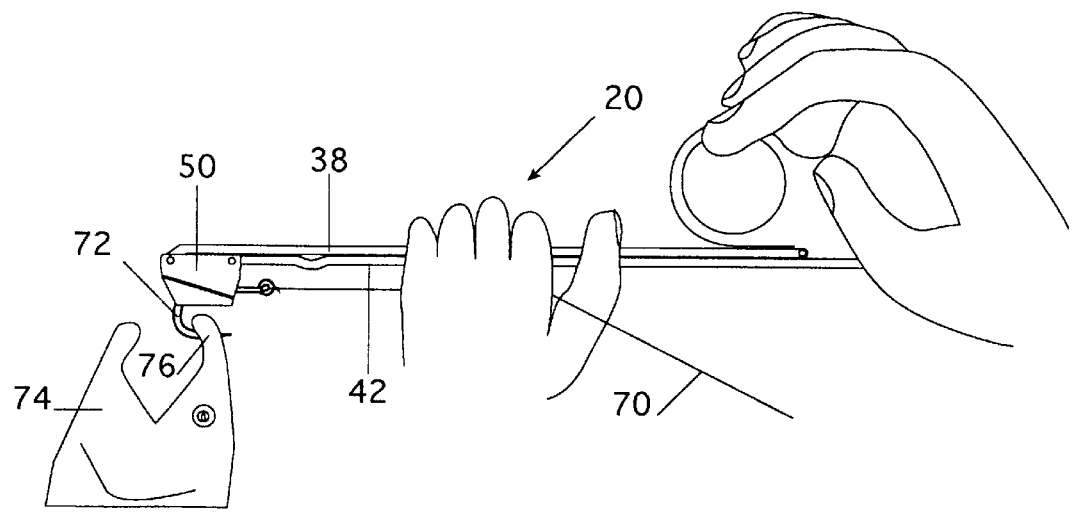
FIG. 5 shows an impact method of removing a hook from a lip-caught fish.

FIGS. 5–9 show alternate methods of removing a hook 72 from a lip-caught 76 fish 74. Again, each of these methods start with the hook 72 locked into place in the stripper notch 58 of the hook engagement member 50. FIG. 5 shows an impact method which is accomplished by sliding the fish hook remover 20 in contact with the hook 72 until a positive lock up is obtained and then turning the fish hook remover 20 between 10–90° to the fish 74. As you hold the line 70 and the middle of the rods 38, 42 of the fish hook remover 20 in the left hand, hit the handle 22 of the fish hook remover 20 with the palm of the right hand. This dislodges the hook 72 and the fish 74 swims away unharmed.

Figure 6:
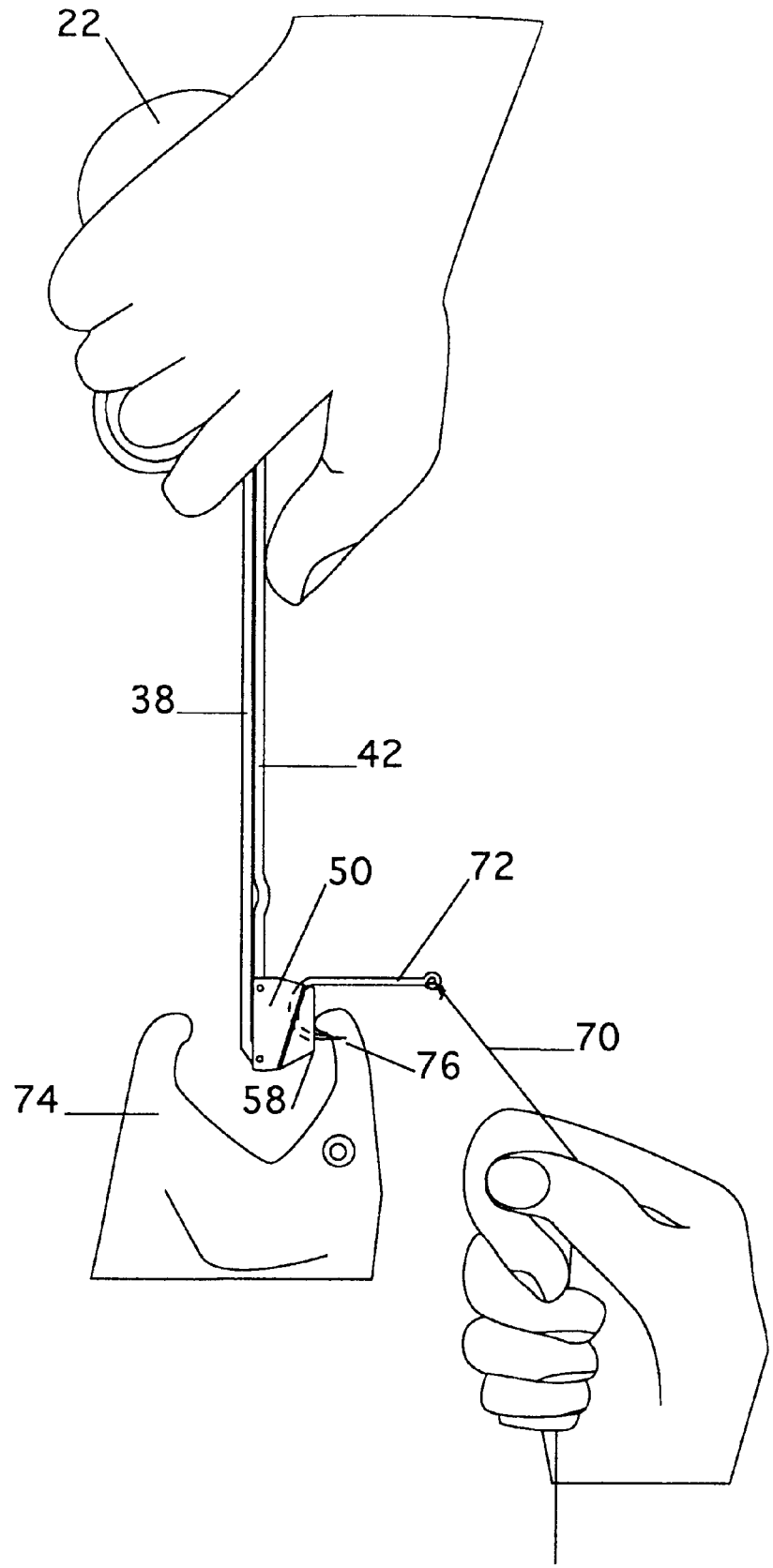
FIG. 6 shows a manual method of removing a hook from a lip-caught fish.

FIG. 6 shows a manual method of removing a hook 72 from a lip-caught 76 fish 74. This method is accomplished by holding the fish hook remover 20 straight down in a non-flipped mode and then tightly pulling the line 70 over and down directly below the fish 74. As the line 70 comes over, the hook 72 is turned within an arc of the stripper notch 58 and this mechanically pulls the hook 72 out of the fish lip 76.

FIGS. 7 shows a gravity method of removing a hook 72 from a lip-caught 76 fish 74 which is accomplished by flipping the hook 72 upside down with the fish hook remover 20 and letting gravity pull the fish's weight down, thereby removing the hook 72. A downward movement with a sudden stop may be required to assist the disengagement between hook 72 and fish 74, especially if the fish 74 is lightweight.

A momentum method, shown in FIG. 8, is accomplished by swinging the fish 74 forward as the fish hook remover 20 is rotated. This flips the fish 74 off of the hook 72.

FIG. 9 shows a manual fish contact method of removing a hook 72 from a lip-caught 76 fish 74. The fish hook remover 20 is held in a non-flipped mode with the right hand and the fish 74 is grasped with the left hand. The fish hook remover 20 is then pushed forward to dislodge the hook 72.

Figure 10:
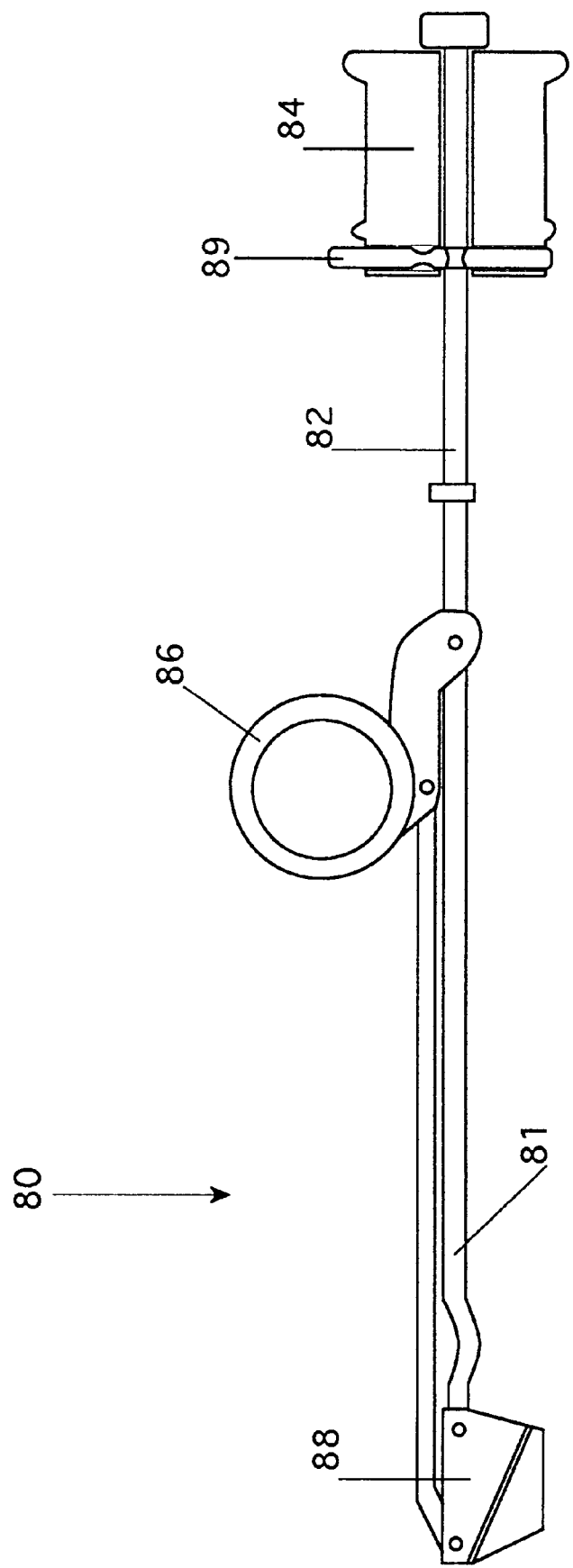
FIG. 10 is a heavy duty model of the fish hook remover for use with large fish, sharks, etc.

FIG. 10 is a heavy duty model of the fish hook remover 80 for use with large fish, sharks, etc. Sharks and certain fish have very tough leathery mouths, and it may be difficult or impossible to flip the hook out of the flesh of the fish without aid. In this embodiment of the fish hook remover 80, one of the parallel rods of the remover 80 is extended from the handle 86 of the remover 80 in the opposite direction from the hook engagement member 88. Around this rod 82 is placed a weight 84. After the hook 72 has been locked into place in the hook engagement member 88, the user may try to manually flip the hook. If this is unsuccessful, or the user does not wish to try, the locking pin 89 is released to allow the weight 84 to drop. On impact, the weight 84 provides a jarring that helps rotate the hook and hook engagement member 88, thereby removing the hook 72 from the fish 74. After use, the weight 84 is returned to its initial position and locked into place with the locking pin 89. Alternatively, a separate rod 82 may extend one of the rods. It is preferred to extend the second rod 81 since the impact of the weight 84 is used to rotate the hook engagement member 88 which is most easily rotated by pushing the second rod 81 downwards.

FIGS. 11A–11G are close-up views of the hook engagement member 50 of the fish hook remover 20. FIG. 11A is a slot-side view, FIG. 11B an enclosed-side view, FIG. 11C a perspective view, FIG. 11D a front end view, FIG. 11E a back end view, FIG. 11F a bottom view, and FIG. 11G a top view. These views show the location and configuration of the features of the hook engagement member 50. The slot or opening 52, located on the slot side of the hook engagement member 50 is angled such that after the line 70 has been inserted into the channel 56 and the fish hook remover 20 has been turned parallel to the line 70, the line 70 is unlikely to accidentally pop out. The channel 56 is sized such that flies, streamers, etc. may slide through the channel 56 as the fish hook remover 20 descends toward the hook 72. The holes 62 at the back edge of the hook engagement member 50 (shown in FIGS. 11A–C) are the connection point for the rods 38, 42. FIG. 11C shows a hook 72 locked into place in the stripper notch 58.

Figure 12:
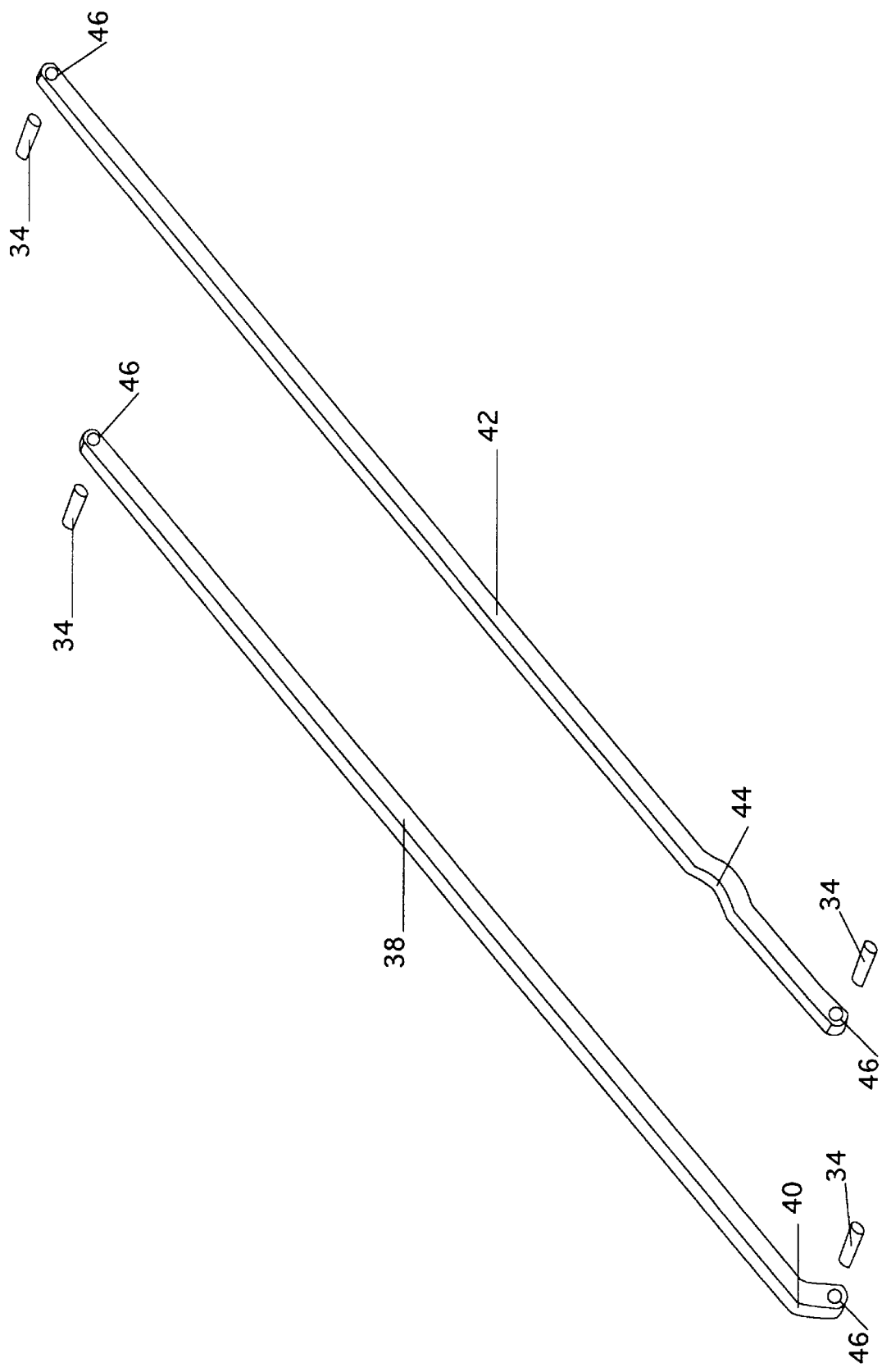
FIG. 12 is an exploded view of the rods and connecting pins of the fish hook remover.

FIG. 12 is an exploded view of the rods 38, 42 and connecting pins 34 of the fish hook remover 20. The first rod 38 has a bend 40 near the hook engagement member end. The bend 40 allows the rod 38 to fit flush against the back edge of the hook engagement member 50. The second rod 42 has a jog 44 a short distance up the rod 42 from the end which connects to the hook engagement member 50. When the fish hook 72 and the hook engagement member 50 have been turned 170°, the jog 44 allows room for the connection between the corner 60 and the bend 40 in the first rod 38 so that the handle 22 may be turned to an extent where the two rods 38, 42 are adjacent one another. The rods 38, 42 are approaching this position in FIG. 2C. The connecting pins 34 shown are placed through the holes 46 in the rods 38, 42 thereby attaching the two rods 38, 42 to the hook engagement member 50 and to the handle 22.

Figure 13B:
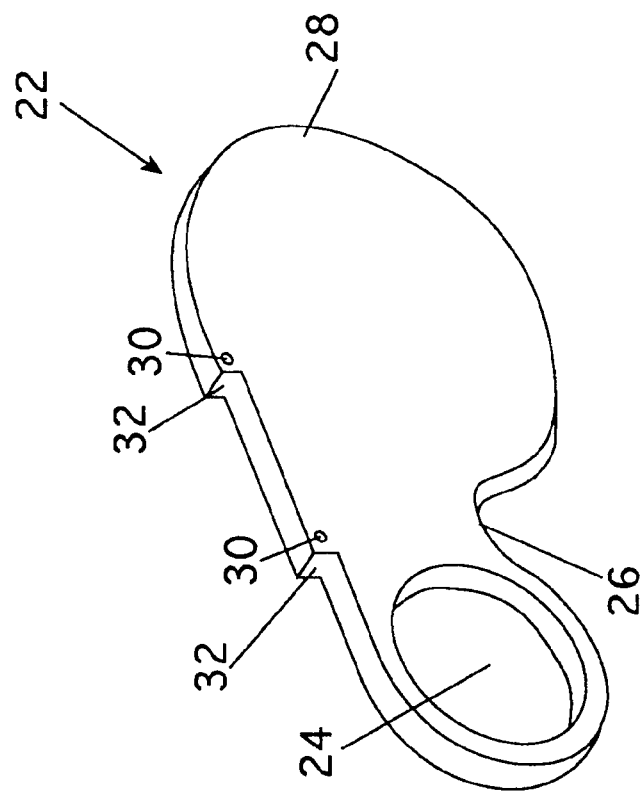
FIGS. 13A and 13B are side and perspective views of the handle of the fish hook remover.
Figure 13A:
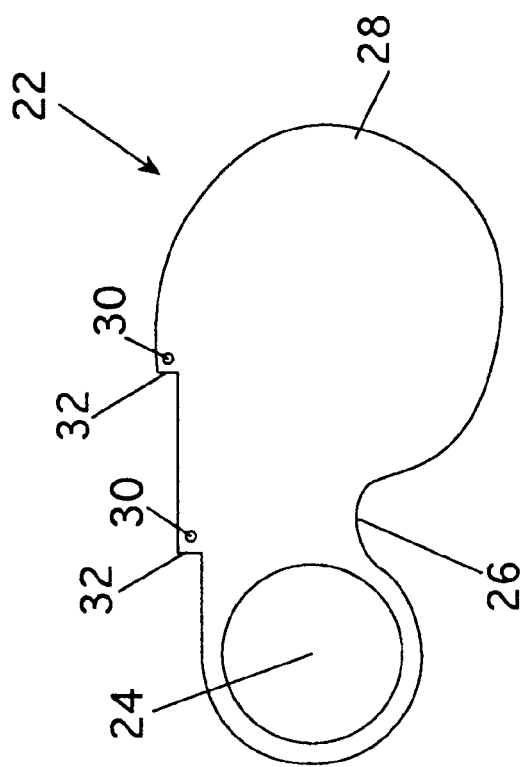

FIG. 13A is a side view and 13B is a perspective view of the handle 22 of the fish hook remover 20. One end of the handle 22 is predominantly a finger hole 24. Adjacent to the finger hole 24 is an indentation 26 which provides a location for a finger when an especially gentle touch is needed, as described in FIG. 4. Moving farther around the perimeter of the handle 22, there is a wide portion 28 for grasping with the palm of the hand. It is from this section that force may be applied if necessary to turn and manipulate the fish hook remover. Finally there are two small holes 30 through which pins 34 connect the rods 38, 42. Each hole 30 is located within a slight projection 32 which allows the rods 38, 42 to lie flush when in their initial position (shown in FIG. 1A). The handle 22 shown is a generally planar embodiment. However, other shapes, such as those which would conform to the shape of the palm and/or have impact surfaces so that a user would not hurt his or her when using the impact methods, are also envisioned.

The methods described herein are preferably used with barbless fishing hooks. The barbless hooks cause the least amount of damage on entry and removal which may be imperative if fish survival is critical. However, when using barbed hooks, the use of the fish hook remover will still significantly decrease damage to the fish. It will also make manipulation of barbed hooks safer for the fisherman.

As fishermen use the fish hook remover 20, they will each develop their own style based on their ability and the type of fish that they are catching. Some fish have specific characteristics such as lockjaw, small mouths, large mouths, sharp teeth, aggressiveness, dangerous thorny spikes and fins, sharp gill plates, and bony mouths. In most cases the fish flops around a lot, requiring the fisherman to control the fish to prevent it from injuring itself or tearing flesh with the hook. While practicing, each fisherman will develop his or her own way to alleviate or minimize whatever problems occur with the fish caught.

Currently, the fish hook remover 20 is formed from metal, such as stainless steel, aluminum, brass, etc. Other materials may also be used. However, in order to function properly, the hook engagement member 50 of the fish hook remover 20 must be able to withstand a significant force without significant deformation, and therefore, must be relatively strong and rigid.

In order to become proficient with the fish hook remover, the user should practice with simulated fish 90. This allows the user to develop some technique prior to encountering a live fish. This is important to assure that the fish receives no more damage than necessary. The novice user may require several attempts to remove the fish and, during this time, a fish may be unnecessarily injured or killed. After practicing on the fish simulation 90, a user will be able to release the fish more gently, quickly and effectively. In order to achieve this practice several fish mouth simulations 90 have been developed to simulate different types of fish.

Figure 14A:
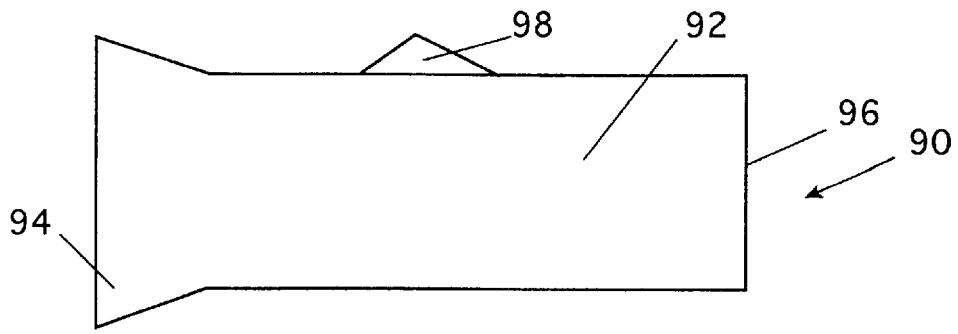
FIGS. 14A–14D are views of a simulated mouth for practice use of the fish hook remover.
Figure 14B:
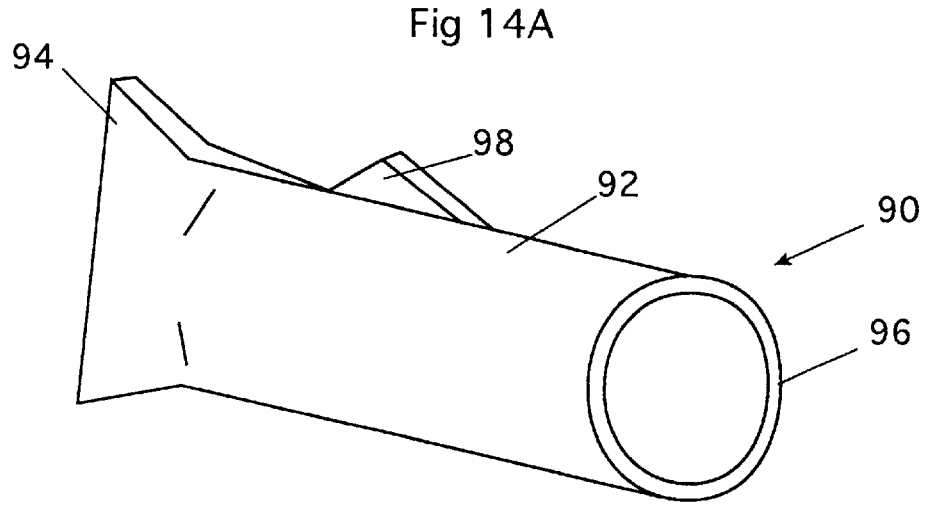
Figure 14C:
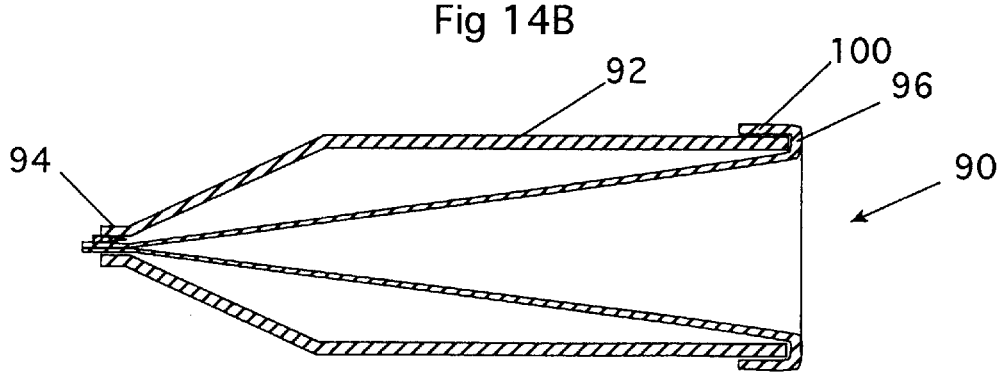
Figure 14D:
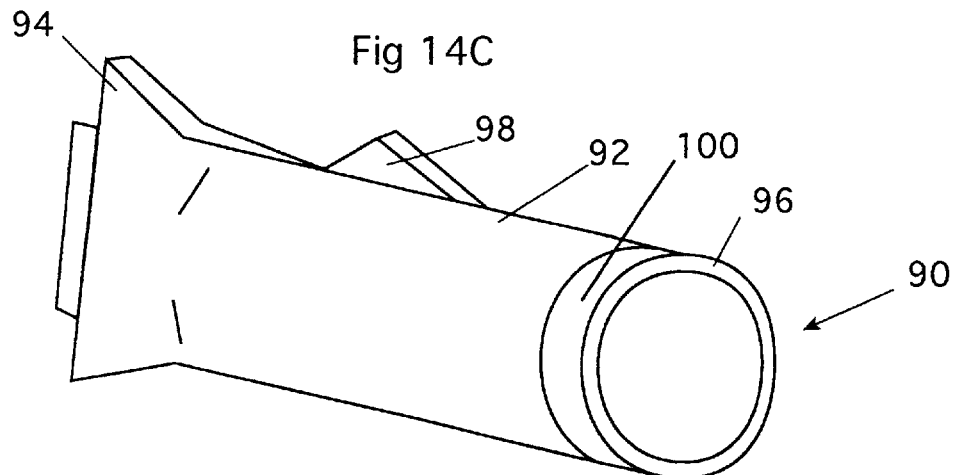

FIGS. 14A–14D are views of a fish simulation 90 for practice use of the fish hook remover 20. FIG. 14A is a side view and FIG. 14B is a perspective view of the rigid outer tube 92 of the fish simulation 90. FIG. 14C is a cross-sectional view and FIG. 14D is a perspective view of the finished simulator 92. The embodiment shown has a rigid outer tube 92 such as a polyvinyl chloride tube having an internal diameter of about 2 inches and an external diameter of 2.25–2.5 inches. In order to give the simulated fish 90 an orientation (i.e. side, belly, back) a dorsal fin 98 is placed on one edge of the simulator 90, thereby defining a back of the simulated fish 90. An elastic rubber tube 100, such as a bicycle tube having a diameter of 2.125 inches, is then placed within the interior of the tube 92. One end 94 of the rigid tube 92 is compressed to firmly hold the corresponding end of the elastic tube 100. The opposite end of the elastic tube 100 is pulled out and around the open mouth 96 of the rigid tube 92 and secured. This provides a simulation of a wide mouth narrowing down to a throat of rubbery material to hook and unhook a fishing hook 72. An alternate version uses the rubber tube alone, thereby providing a simulation of a more flexible, floppy fish. In order to preserve the rubber material, it is preferred to use barbless hooks when practicing with the fish simulators 92.

Figure 15:
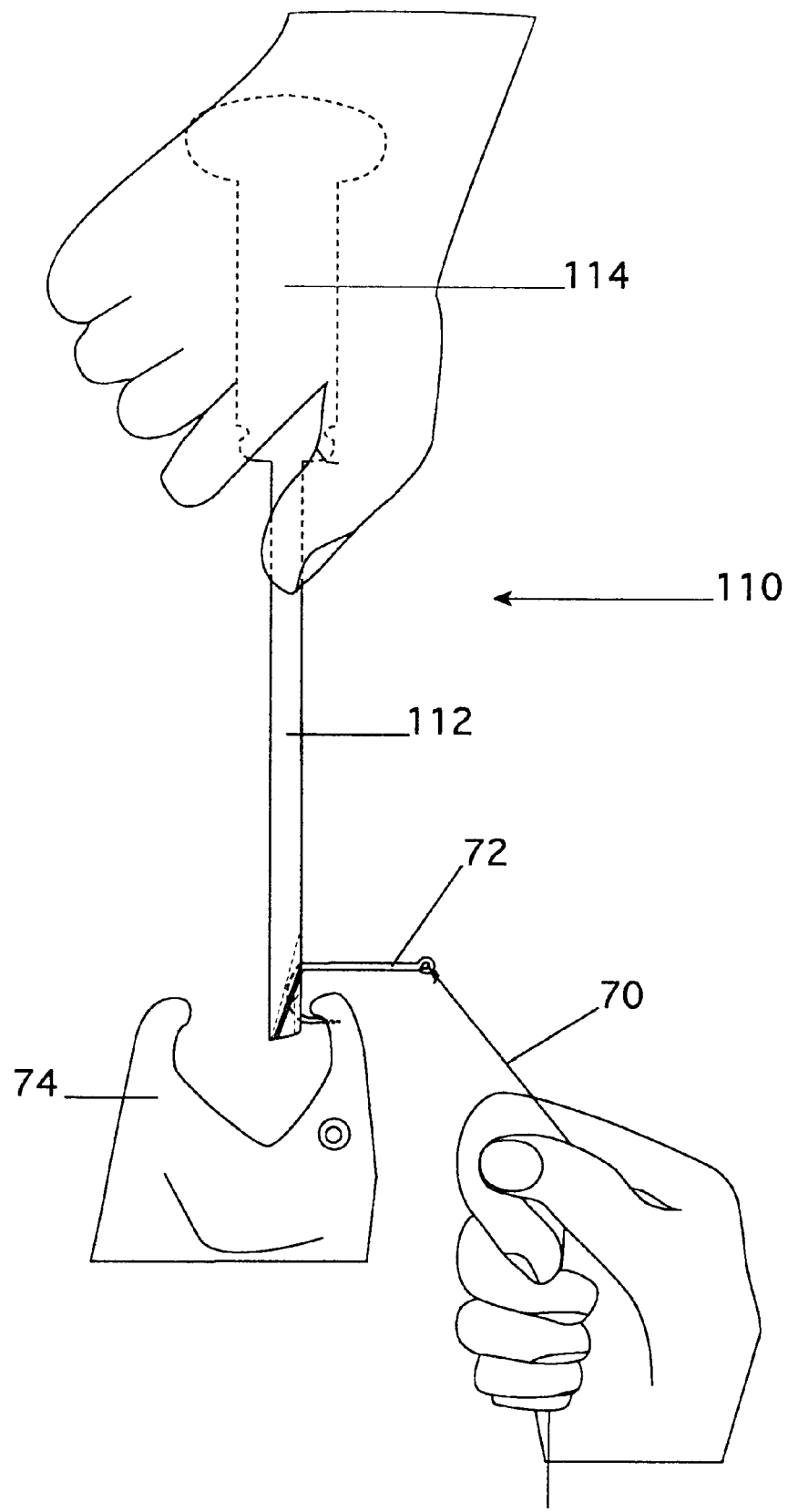
FIG. 15 shows a non-articulated embodiment of the fish hook remover.

An alternate, non-articulated embodiment 110 is shown in FIG. 15. This embodiment 110 would have a single, non-pivoting rod 112 extending down from the handle 114 to the hook engagement member 116. As shown the hook engagement member 116 is actually formed as the distal portion of the rod 112. The non-articulated embodiment 110 would be used with the manual and impact methods described and shown in FIGS. 5, 6, and 9.

Although the examples given include many specificities, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

I claim:

1. A fish hook removing device for removing a hook from a fish, comprising:
    a hook engagement means for engaging the hook having a channel running therethrough along a longitudinal axis, said channel forming a generally enclosed chamber within said hook engagement means,
    an opening in said hook engagement means and extending into said chamber,
    a handle,
    a first rod, having a first end and a second end, said first end of said first rod being pivotally connected to said hook engagement means,
    and a second rod having a first end and a second end, said first end of said second rod being pivotally connected to said hook engagement means,
    wherein said second end of said first rod and said second end of said second rod are pivotally connected to said handle,
    wherein said hook engagement means has a first position and a second position,
    and wherein in said second position, said hook engagement means is generally inverted from said first position.

2. The fish hook removing device of claim 1 wherein said second rod has a jog, said jog being located at a distance from said first end of said second rod, said distance being approximately equal to a length of said hook engagement means, said jog being a slight bowing of said second rod, and wherein said first end of said first rod is bent.

3. The fish hook removing device of claim 1 wherein said opening is generally linear and is at an angle to said channel.

4. The fish hook removing device of claim 1 further comprising a notch, said notch being located in a bottom edge of said hook engagement member.

5. The fish hook removing device of claim 1 wherein said hook engagement means is a generally cylindrical hook engagement member and said first end of said first rod being pivotally connected proximate a bottom edge of said hook engagement member and said first end of said second rod being pivotally connected proximate a top edge of said hook engagement member.

6. The fish hook removing device of claim 1 further comprising an extension and a weight, said extension member being attached proximate to said second end of said second rod, and said weight being slidably mounted on said extension rod.

7. The fish hook removing device of claim 1 further comprising a first distance between said first end of said first rod and said first end of said second rod and a second distance between said second end of said first rod and said second end of said second rod, said first distance being smaller than said second distance.

8. A fish hook removing device for removing a hook from a fish, comprising:
    a hook engagement member having a channel running therethrough from a top end to a bottom end and along a longitudinal axis and defining a generally enclosed chamber within said hook engagement member and an opening extending into said chamber,
    a handle,
    a first rod having a first end and a second end, said first end being pivotally connected proximate said bottom end of said hook engagement member, said second end being pivotally connected to said handle,
    a second rod having a first end and a second end, said first end of said second rod being pivotally connected proximate said top end of said hook engagement member, said second end of said second rod being pivotally connected to said handle,
    wherein said hook engagement means has a first position and a second position,
    and wherein in said second position, said hook engagement means is generally inverted from said first position.

9. The fish hook removing device of claim 8 wherein said opening is generally linear and runs from said top end to said bottom end.

10. The fish hook removing device of claim 8 wherein said second end of said first rod and said second end of said second rod are attached to said handle at spaced apart locations.

11. The fish hook removing device of claim 8 further comprising a notch located proximate said channel and proximate said bottom end of said hook engagement member.

12. The fish hook removing device of claim 8 wherein said handle has a hole located therethrough and an indentation proximate said hole.

13. The fish hook removing device of claim 8 further comprising an extension rod and a weight, said extension member being attached proximate to said second end of said second rod, and said weight being slidably mounted on said extension rod.

14. The fish hook removing device of claim 13 further comprising a locking means for resisting relative motion between said extension member and said weight.

15. The fish hook removing device of claim 8 further comprising a first distance between said first end of said first rod and said first end of said second rod and a second distance between said second end of said first rod and said second end of said second rod, said first distance being smaller than said second distance.

16. The fish hook removing device of claim 8 wherein said second rod has a jog, said jog being located at a distance from said first end, said distance being approximately equal to a length of said hook engagement means, said jog being a slight bow of the second rod, and wherein said first end of said first rod is bent.

17. A fish hook removing device for removing a hook having an eye attached to fishing line from a fish, comprising:

a hook engagement member having a channel running therethrough along a longitudinal axis, said channel forming a generally enclosed chamber within said hook engagement means, said channel sized to allow the eye of the hook to pass therethrough a notch in a bottom edge of said hook engagement member, said notch sized to receive a portion of the hook therein, an opening within a wall of said hook engagement member extending into said channel, said opening configured to allow a piece of fishing line to pass therethrough, a handle, a first rod having a first end and a second end, a second rod having a first end and a second end, a first pivot point connecting said first end of said first rod to said hook engagement member, a second pivot point connecting said first end of said second rod to said hook engagement member, a third pivot point connecting said second end of said first rod to said handle, and a fourth pivot point connecting said second end of said second rod to said handle, wherein said hook engagement member has a first position and a second position, wherein said hook engagement member is moved between said first position and said second position by rotation of said handle, and wherein in said second position, said hook engagement member is generally inverted from said first position.

18. The fish hook removing device of claim 17 wherein said first rod and said second rod have generally consistent cross sections.

19. The fish hook removing device of claim 18 wherein said second has a jog, said jog being located at a distance from said first end of said second rod, said distance being approximately equal to a length of said hook engagement member, said jog being a slight bowing of said second rod, and wherein said first end of said first rod is bent.

20. The fish hook removing device of claim 19 further comprising a first distance between said first end of said first rod and said first end of said second rod and a second distance between said second end of said first rod and said second end of said second rod, said first distance being smaller than said second distance.

* * * * *